Dec. 30, 1952  P. GÉRARD  2,623,353
COMBINED FLUID PRESSURE AND MECHANICAL
BEARING FOR GAS TURBINE ENGINES
Filed July 8, 1950  3 Sheets-Sheet 1

Inventor
Paul Gérard
By Brown & Deward
Attorneys

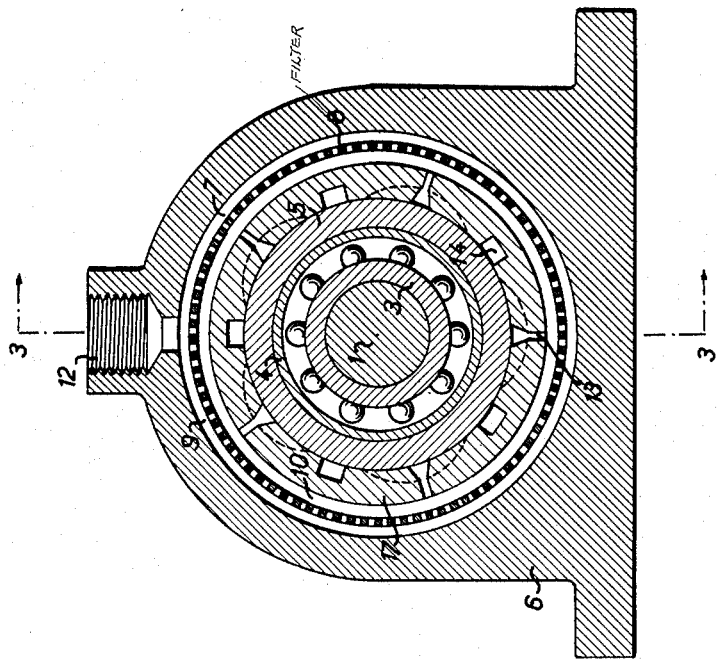
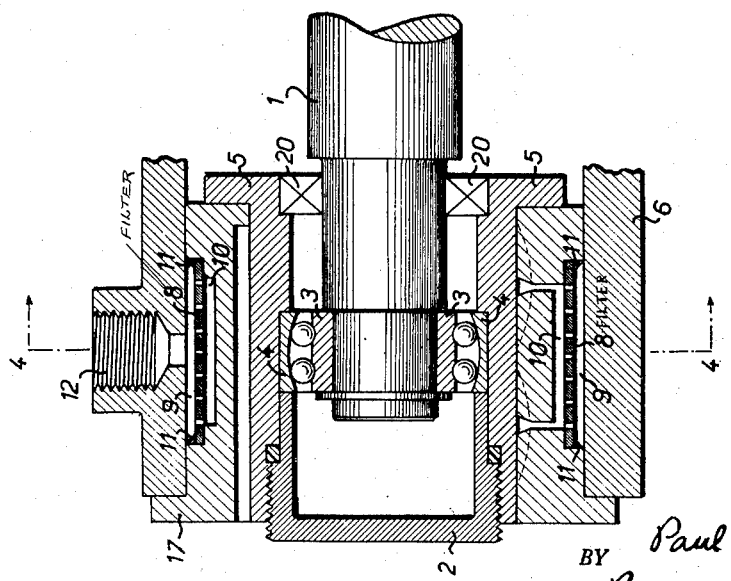

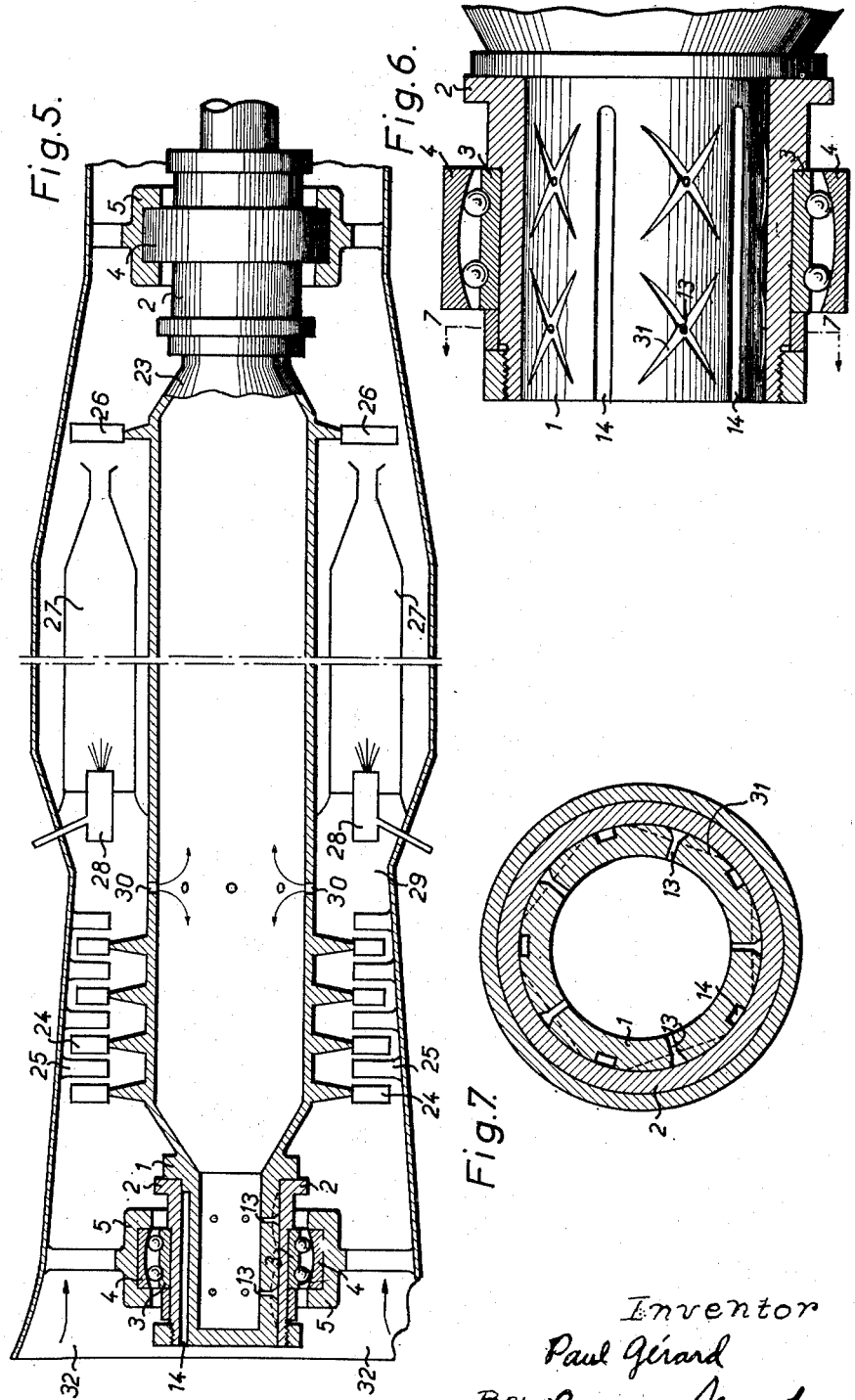

Patented Dec. 30, 1952

2,623,353

UNITED STATES PATENT OFFICE 2,623,353

COMBINED FLUID PRESSURE AND MECHANICAL BEARING FOR GAS TURBINE ENGINES

Paul Gérard, Paris, France

Application July 8, 1950, Serial No. 172,665
In France February 1, 1950

12 Claims. (Cl. 60—39.09)

In the patent application Ser. No. 699,051 of September 24, 1946, now abandoned, and in the patent application Ser. No. 172,666, filed July 8, 1950 (in the latter case jointly with Henri Seranne), I have described bearings for supporting or guiding a rotary element in which a pressure fluid is fed between the surface of the bearing element and said rotary element and spreads to maintain an annular clearance between said elements thereby holding the rotary element in a floating state.

The feeding fluid must be supplied under a certain pressure, which requires a feeding source and ducts adapted to feed the fluid between said elements. It may happen that such a feeding becomes faulty for any reason such as a failure of the feeding source, a break of the feeding ducts or even due to the very nature of the feeding source. In particular, in certain cases, the bearing may be fed with a pressure fluid by means of a pump or compressor actuated by the very shaft which is journalled in said bearing.

My invention has for its purpose, to permit the use of fluid bearings even in the above-mentioned cases, while ensuring, in particular, the starting, i. e. a rotation with a sufficiently reduced friction between the rotary element and the bearing, even at speeds at which the pressure fluid feeding is not sufficient to ensure the floating of said rotary element and, more generally, a rotation of the rotary element at any speed with a friction sufficiently reduced to avoid any risk in the case of an unexpected failure of the pressure fluid feeding system.

The main object of my invention is to provide a bearing comprising, in combination, a mechanical bearing of any type, such as an oil-film, ball, roller or needle bearing and a fluid bearing, e. g. of the type described in the above-mentioned patent applications, these two bearings being co-axial and one of them being journalled in the other one.

It will be understood that in a bearing according to the invention, independently of the floating action more or less ensured by the fluid bearing during certain stages of the operation, the fluid circulation ensures the cooling of the housing of the mechanical bearing which is in contact with said fluid.

Another object of my invention is to provide a combined bearing of the type described in which the rotary element is mounted in or on a mechanical bearing in the usual manner, the outer or inner periphery of said mechanical bearing being in turn mounted in or respectively on a cylindrical member constituting one of the elements of a fluid bearing, the chambers and grooves of said fluid bearing being formed either in the outer respectively inner wall of the mechanical bearing, or in the inner respectively outer wall of the supporting cylindrical member.

It is to be understood that the invention is in no way limited either to any specific type of the bearing which has been called herebefore "mechanical bearing," this term being intended to cover all existing or future bearings and, in particular, any oil-film, ball, roller or needle bearing, etc. or to any specific embodiment of the fluid bearing which may be of any type and, in particular, of the type described in the above-mentioned patent applications, or of any other existing or future type, the main object of the invention being to provide a bearing constituted in combination by a mechanical bearing and by a fluid bearing, one of said bearings supporting the other one.

Another object of the invention is to provide a combination of a mechanical bearing, such as a ball, roller or needle bearing with a fluid bearing and, more particularly, with an air bearing and still more particularly with an air-bearing of the type described in the above-mentioned patent applications.

A further object of the invention is to provide a device comprising in combination a gas turbine, at least two combined bearings according to the invention supporting the rotor of said turbine and means to feed the air bearings of said combined bearings with compressed air supplied by the compressor driven by said turbine and particularly the compressor feeding the combustion chamber or chambers of the turbine proper.

A well-known problem in gas turbines is to reach considerable rotation speeds and the limitation of said speeds is due, in particular, to the nature of the mechanical bearings heretofore used. The mere fact of completing the mechanical bearing by a compressed air bearing surrounding said mechanical bearing or surrounded by the same permits it to reach far higher speeds without any risk resulting from a failure of the air bearing and without impairing the turbine starting and deceleration when stopping. Moreover, such a combination implies no mechanical complication due to the very fact that the bearings are fed from the compressor driven by the turbine, which compressor, above a certain speed and, in fact, immediately after starting, supplies compressed air at pressures exceeding materially the value required for feeding the air bearings. With combined bearings according to the invention, it is thus sufficient, for ensuring the floating of the shaft to provide a safe feeding of the compressor air into said bearings, the air consumption being in fact practically negligible with respect to the normal output of the compressor.

It will be easily understood that the cost of the combined bearing with respect to the cost of the mechanical bearing alone may also be considered as negligible in a gas turbine. It must be well understood that in the following description and in the claims, the expression "gas turbine" includes turbine of all known or future types, such as turbine driving an air screw, turbojets, turbines for driving cars, etc.

The operation of the bearing according to the invention, in the case of a gas turbine, is as follows:

When starting, the shaft rotates in the mechanical bearings, which implies no drawback due to the very fact of the reduced speed of said shaft during this stage. As soon as the output of the compressor reaches a sufficient pressure, the air bearings become automatically operative while the mechanical bearings are made practically inoperative. In the case of an unexpected failure of the air bearings, the shaft is further supported by the mechanical bearings, which absolutely suppresses any risk. In the case of a failure of the air bearings, e. g. due to a lack of feeding pressure, the power transformed into friction which causes a wear of the parts in contact with one another is only the rotational kinetic energy of the part interposed between both bearings and not the rotational kinetic energy of the rotor.

The invention will be more easily understood with reference to the accompanying drawings in which, as a mere illustration, are shown some embodiments of the invention.

In these drawings:

Fig. 3 is an axial section along axis 3—3 of Fig. 4 showing another embodiment.

Fig. 4 is a section along axis 4—4 of Fig. 3.

Fig. 5 shows a gas turbine designed according to the invention.

Fig. 6 is an axial sectional view on a larger scale of the bearing shown in Fig. 5 and Fig. 7 is a section along axis 7—7 of Fig. 6.

Figure 1:
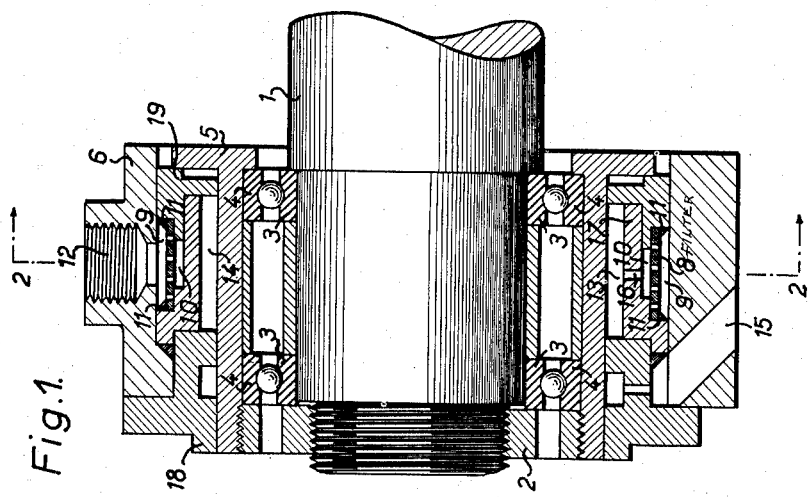
Fig. 1 is an axial section along axis 1—1 of Fig. 2 of the end of a shaft journal led in a combined bearing according to the invention.

Referring first to Fig. 1, there is shown at 1 a shaft journalled in a combined bearing according to the invention. On shaft 1 are screwed by means of a nut 2 two inner races 3 of ball bearings, the outer races 4 of which are secured in a sleeve 5. Sleeve 5 is journalled in turn in a fluid bearing constituted by a body 6 provided with a cylindrical bore containing brasses 17—18—19 described in detail hereafter, a pressure fluid being fed between the wall of said cylindrical bore and the outer wall of said brasses into the annular chamber 7 provided therebetween. A cylindrical filter 8 is provided between the peripherical zone 9 and the central zone 10 of said chamber, filter 8 being soldered as shown at 11 on the elements in which is formed said zone 9, as described hereafter. Shaft 1, both races of ball bearings 3—4, sleeve 5 and the bore of the body 6 are all co-axial, at least when the fluid bearing operates under normal pressure. The pressure fluid is fed through a suitable duct, screwed at 12 on an inlet port provided in the upper portion of the body 6.

Figure 2:
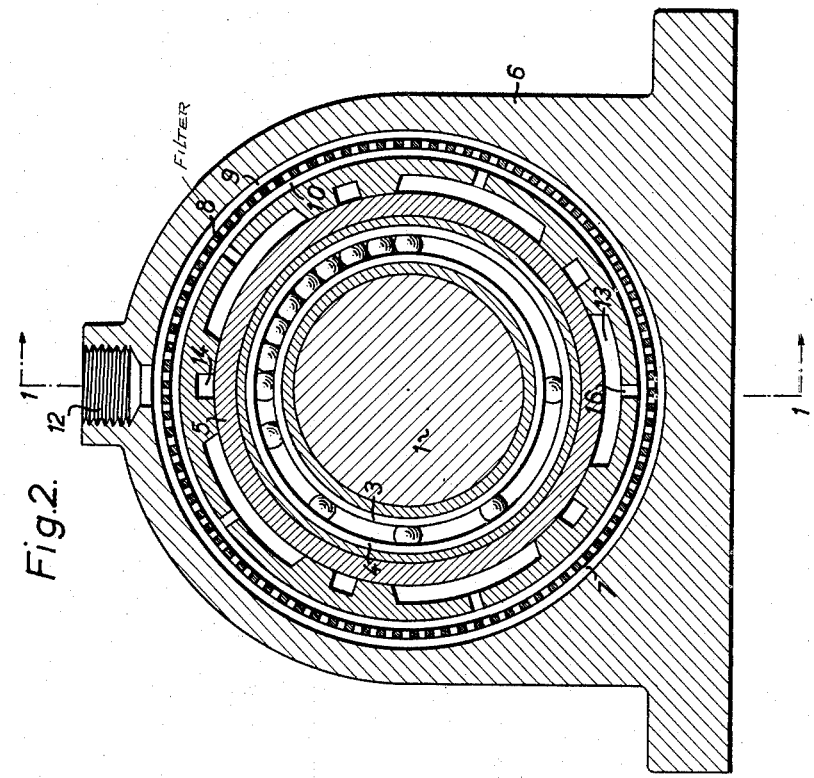
Fig. 2 is a section along axis 2—2 of Fig. 1.

Referring now to Fig. 2, there is shown at 16 throttlings bringing the fluid from the annular chamber 7 into the various feeding zones 13 (five in the example shown). Between the successive adjacent zones 13 are provided pressure fluid outlet grooves 14 communicating with an outlet port 15 provided for this purpose at the lower portion of body 6. The above-mentioned chambers, feeding zones, throttlings and outlet grooves, are formed in the example shown, in three elements, viz. a central ring 17 in which zones 13 and throttlings 16 are provided and two collars 18 and 19 disposed on either side of said ring 17, the grooves 14 being provided in ring 17 and collar 18. Moreover zones 9 and 10 of chamber 7 are provided between suitable shoulderings formed for this purpose on ring 17 and collar 19.

The embodiment shown in Figs. 1 and 2 is particularly adapted to the case of liquid fluid bearings.

In the alternative embodiment shown in Figs. 3 and 4, more particularly adapted to gaseous fluid bearings and, in particular, to compressed air bearings, ball bearings 3—4 are substituted by a single central bearing having two ball rows mounted in a knee-joint. The inner race of said bearing is shown at 3 and its knee-joint outer race is shown at 4.

In this embodiment, a pressure-tight joint 20 of any type, adapted to ensure the tightness of the inner chamber 21 which may be, for example filled with oil, is provided between the end journal of shaft 1 rotatively mounted in race 3 and shaft 1 proper. The outer race 4 of the ball bearing is rotatively mounted as previously in a sleeve 5 which is journalled in turn in a gaseous fluid bearing such as an air bearing. In this embodiment, the above-mentioned elements 17—18 and 19 are substituted by a one-piece sleeve 17 in which are provided recesses constituting the annular chamber 7 which comprises two annular compartments 9 and 10 separated from one another by a filter 8. In this embodiment, the above-mentioned feeding zones are constituted by nozzles 13 feeding groove networks.

Referring now to Fig. 5, there is shown a gas turbine the rotor of which is journalled in combined bearings according to the invention. In this figure, there is shown at 22 the gas turbine casing and at 23 the shaft of the turbine rotor. Said shaft is journalled in two bearings of a type similar to that of Figs. 3 and 4, except that in this embodiment the ball bearing is disposed outwardly while the compressed air bearing is interposed between the inner race of said ball-bearing and the rotor shaft. Both bearings of the shaft 1 are the same, the right hand bearing being shown in a front elevational view and the left-hand bearing being shown in an axial sectional view. In this figure, the parts corresponding to those of the preceding figures are designated by the same reference numbers.

Shaft 23 of the compressor carries, as shown at 24, a series of rotating bladings between which are interposed stationary bladings 25 solid with casing 22. At its other end, shaft 23 carries the blade-wheel 26 of the turbine. The combustion chambers are shown at 27 and the fuel injectors at 28.

The operation of the device is as follows: the air is admitted at 32, compressed by bladings 24 and 25 and brought, as shown at 29, into the space located between the compression chamber and the combustion chambers. At this level are provided, on the wall of the hollow shaft 23, a set of holes 30 through which the compressed air penetrates into said hollow shaft. Thence, the air is projected through nozzles 13 to be interposed between the end journals of shaft 23 and sleeves 2 integral with the inner races of the ball bearings, this assembly thus constituting a combined bearing according to the invention. With this arrangement, during the starting stage when the air is not yet sufficiently compressed so that the fluid bearing cannot support shaft 23, said shaft is supported by ball bearings 3—4. As soon as the air pressure is sufficiently high, the fluid bearings become operative and support in turn shaft 23 which suppresses, in fact, any friction between the shaft and its bearings.

Figs. 6 and 7 show in detail the construction of the combined bearings used in the embodiment of Fig. 5 for supporting the rotor shaft of a gas turbine. In this figure, it may be seen that the feeding zones of the fluid bearing portion of the combined bearings are constituted by oil grooves 31 arranged along the diagonals of said feeding zones and fed substantially at their centre by the above-mentioned nozzles 13. The fluid outlet grooves are shown at 14.

It is to be understood that the embodiment of the gas turbine shown in Figs. 5 to 7 is given as a mere illustration and that any desired modification may be made thereto within the scope of the invention. In particular, according to another feature of the invention, it is possible to journal in combined bearings not only the turbine rotor, as shown in Figs. 5 to 7, but also any rotating part of the gas turbine, and more particularly the wheels carrying the directing fluids of the compressor and/or turbine in the case when said wheels, instead of being integral with casing 22, are made movable for well defined purposes, as described in British Patent No. 587,528, accepted April 29, 1947, filed by Power Jets Ltd. Moreover, it is obvious that it is possible to use in a gas turbine instead of the bearings shown in Figs. 5 to 7 combined bearings of the type shown in Figs. 3 and 4 in which the fluid bearing surrounds the mechanical bearing.

What is claimed is:

1. A device for supporting a rotatable element by a stationary concentric element, comprising between said elements a mechanical antifriction bearing fast with one of said elements and mounted with a clearance with respect to the other, means to continuously feed pressure fluid into said clearance through a plurality of circumferentially spaced inlets and means to evacuate said fluid, whereby a fluid film is maintained between the surfaces defining said clearance, the friction between said surfaces being lower than the friction between the elements constituting said mechanical antifriction bearing, whereby, when the rotatable element is driven, the same rotates in respect to the stationary element without substantial rotation of the mechanical bearing elements in respect to each other as long as said fluid circulation is maintained at a rate sufficient to ensure the presence of said film.

2. In a fluid pressure bearing structure for supporting a rotatable element by a stationary element with a clearance space therebetween, the combination with a bearing surface comprising a plurality of circumferentially spaced fluid pressure zones, of at least one antifriction bearing in series with said bearing surface and including inner and outer race members and rolling bodies therebetween, one of said race members being in contact with one of said elements and the other spaced from contact with said bearing surface, whereby said antifriction bearing will automatically provide antifriction support for said rotatable element when the fluid pressure support ceases.

3. A device for supporting a rotatable element by a stationary concentric element, comprising between said elements a bearing device including inner and outer race members and rolling bodies therebetween, one of said race members being fast with one of said elements and the other member being mounted with a clearance with respect to the other element, a plurality of circumferentially spaced pressure zones formed in one of the surfaces defining said clearance, means including nozzles for separately conducting fluid under pressure to said zones, and outlet channels between said zones through which said fluid is discharged from said clearance, whereby the surfaces defining said clearance are held out of contact with one another as long as said clearance is fed with said pressure fluid.

4. A device for supporting a rotatable element by a stationary concentric element, comprising between said elements a bearing device including inner and outer race members and rolling bodies therebetween, one of said race members being fast with one of said elements and the other member being mounted with a clearance with respect to the other element, a plurality of circumferentially spaced pressure zones formed in one of the surfaces defining said clearance, means including nozzles for separately feeding with fluid under pressure each of said zones, a system of grooves of small cross-section in each of said zones to spread said pressure fluid along the surfaces of said zones and outlet channels separating said zones through which said fluid is discharged from said clearance, whereby the surfaces defining said clearance are held out of contact with one another as long as said clearance is fed with said pressure fluid.

5. A device for supporting a rotatable element by a stationary concentric element, comprising between said elements a bearing device including inner and outer race members and rolling bodies therebetween, one of said race members being fast with one of said elements and the other member being mounted with a clearance with respect to the other element, a plurality of circumferentially spaced pressure zones formed in one of the surfaces defining said clearance, means including nozzles for separately feeding with a compressed gas each of said zones, a system of grooves of small cross-section in each of said zones to spread said compressed gas along the surfaces of said zones and outlet channels separating said zones through which said gas is discharged from said clearance, whereby the surfaces defining said clearance are held out of contact with one another as long as said clearance is fed with said compressed gas.

6. A device for supporting a rotatable element by a stationary concentric element, comprising between said elements a bearing device including inner and outer race members and rolling bodies therebetween, the outer race member being fast with said stationary element and the inner race member being mounted with a clearance with respect to said rotatable element, a plurality of circumferentially spaced pressure zones formed in one of the surfaces defining said clearance, means including nozzles for separately feeding each of said zones with a compressed gas, a system of grooves of small cross-section in each of said zones to spread said compressed gas along the surfaces of said zones and outlet channels separating said zones through which said gas is discharged from said clearance, whereby the surfaces defining said clearance are held out of contact with one another as long as said clearance is fed with said compressed gas.

7. A device for supporting a rotatable element by a stationary concentric element, comprising between said elements a bearing device including inner and outer race members and rolling bodies therebetween, the inner race member being fast with said rotatable element and the outer race member being mounted with a clearance with respect to said stationary element, a plurality of circumferentially spaced pressure zones formed in one of the surfaces defining said clearance, means including nozzles for separately feeding each of said zones with a compressed gas, a system of grooves of small cross-section in each of said zones to spread said compressed gas along the surfaces of said zones and outlet channels separating said zones through which said gas is discharged from said clearance, whereby the surfaces defining said clearance are held out of contact with one another as long as said clearance is fed with said compressed gas.

8. A gas turbine comprising a stationary element, a rotatable element, an air compressor driven by said rotatable element, a bearing device including inner and outer race members and rolling bodies therebetween, one of said race members being fast with one of said elements and the other member being mounted with a clearance with respect to the other element, a plurality of circumferentially spaced pressure zones formed in one of the surfaces defining said clearance, means to conduct air compressed by said air compressor into said zones, and outlet channels separating said pressure zones through which said air is discharged therefrom, whereby the surfaces defining said clearance are held out of contact with each other as long as the pressure of the air fed from said compressor is sufficient to maintain said rotatable element in a floating state.

9. A gas turbine comprising a stationary element, a rotatable element, an air compressor driven by said rotatable element, a bearing device including inner and outer race members and rolling bodies therebetween, one of said race members being fast with one of said elements and the other member being mounted with a clearance with respect to the other element, a plurality of circumferentially spaced pressure zones formed in one of the surfaces defining said clearance, means including nozzles for separately feeding each of said zones with air compressed by said air compressor, a system of grooves of small cross-section in each of said zones to spread said compressed air along the surfaces of said zones and outlet channels separating said zones through which said air is discharged from said clearance whereby the surfaces defining said clearance are held out of contact with one another as long as the pressure of the air fed from said compressor is sufficient to maintain said rotatable element in a floating state.

10. A gas turbine comprising a stationary element, a rotatable element, an air compressor driven by said rotatable element, a bearing device including inner and outer race members and rolling bodies therebetween, the inner race member being fast with said rotatable element and the outer race member being mounted with a clearance with respect to said stationary element, a plurality of circumferentially spaced pressure zones formed in one of the surfaces defining said clearance, means including nozzles for separately feeding each of said zones with air compressed by said air compressor, a system of grooves of small cross-section in each of said zones to spread said compressed air along the surfaces of said zones and outlet channels separating said zones through which said air is discharged from said clearance whereby the surfaces defining said clearance are held out of contact with one another as long as the pressure of the air fed from said compressor is sufficient to maintain said rotatable element in a floating state.

11. A gas turbine comprising a stationary element, a rotatable element, an air compressor driven by said rotatable element, a bearing device including inner and outer race members and rolling bodies therebetween, the outer race member being fast with said stationary element and the inner race member being mounted with a clearance with respect to said rotatable element, a plurality of circumferentially spaced pressure zones formed in one of the surfaces defining said clearance, means including nozzles for separately feeding each of said zones with air compressed by said air compressor, a system of grooves of small cross-section in each of said zones to spread said compressed air along the surfaces of said zones and outlet channels separating said zones through which said air is discharged from said clearance whereby the surfaces defining said clearance are held out of contact with one another as long as the pressure of the air fed from said compressor is sufficient to maintain said rotatable element in a floating state.

12. A gas turbine comprising a conventional combustion system, a stationary element, a rotatable element, an air compressor driven by said rotatable element to feed compressed air to said combustion system, a bearing device including inner and outer race members and rolling bodies therebetween, one of said race members being fast with one of said elements and the other member being mounted with a clearance with respect to the other element, a plurality of circumferentially spaced pressure zones formed in one of the surfaces defining said clearance, means including nozzles for separately feeding each of said zones with air compressed by said air compressor, a system of grooves of small cross-section in each of said zones to spread said compressed air along the surfaces of said zones and longitudinal outlet channels separating said zones through which said air is discharged from said clearance whereby the surfaces defining said clearance are held out of contact with one another as long as the pressure of the air fed from said compressor is sufficient to maintain said rotatable element in a floating state.

PAUL GÉRARD.

REFERENCES CITED

The following references are of record in the file of this patent:

UNITED STATES PATENTS

| Number | Name | Date |
|---|---|---|
| 1,906,715 | Penick | May 2, 1933 |
| 2,010,362 | Herrmann | Aug. 6, 1935 |
| 2,049,343 | Warren | July 28, 1936 |
| 2,112,391 | Anxionnaz | Mar. 29, 1938 |
| 2,165,448 | Browne | July 11, 1939 |
| 2,182,012 | Bunnell | Dec. 5, 1939 |
| 2,334,625 | Heppner | Nov. 16, 1943 |
| 2,459,826 | Martellotti | Jan. 25, 1949 |

FOREIGN PATENTS

| Number | Country | Date |
|---|---|---|
| 626,268 | Great Britain | July 12, 1949 |